(12) United States Patent
Sakamoto et al.

(10) Patent No.: US 7,819,477 B2
(45) Date of Patent: Oct. 26, 2010

(54) RECLINING ADJUSTER

(75) Inventors: Yutaka Sakamoto, Hiroshima (JP);
Hiroki Honda, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 239 days.

(21) Appl. No.: 12/089,550

(22) PCT Filed: Oct. 12, 2006

(86) PCT No.: PCT/JP2006/320422

§ 371 (c)(1),
(2), (4) Date: Apr. 8, 2008

(87) PCT Pub. No.: WO2007/043628

PCT Pub. Date: Apr. 19, 2007

(65) Prior Publication Data

US 2009/0146478 A1    Jun. 11, 2009

(30) Foreign Application Priority Data

Oct. 12, 2005  (JP) .............................. 2005-297332

(51) Int. Cl.
*B60N 2/22* (2006.01)
(52) U.S. Cl. ................................ 297/362.14
(58) Field of Classification Search ............ 297/216.13, 297/216.14, 361.1, 362.11, 362.14; 74/425
See application file for complete search history.

(56) References Cited

U.S. PATENT DOCUMENTS

| | | | | |
|---|---|---|---|---|
| 4,685,735 A | * | 8/1987 | McFalls et al. ........... | 297/361.1 |
| 5,295,730 A | * | 3/1994 | Rees ....................... | 297/361.1 |
| 5,590,562 A | * | 1/1997 | Scheck et al. ............. | 74/89.14 |
| 5,605,071 A | * | 2/1997 | Buchanan, Jr. ............. | 74/425 |

(Continued)

FOREIGN PATENT DOCUMENTS

JP    58-35175    11/2003

(Continued)

OTHER PUBLICATIONS

PCT/ISA/210 International Search Report for International Application No. PCT/JP2006/320422 dated Jan. 23, 2007), 2 pages.

*Primary Examiner*—Peter R. Brown
(74) *Attorney, Agent, or Firm*—Cozen O'Connor

(57) ABSTRACT

Reduces backlash and clearance in a thrust direction of a worm when engaging a seat back to more securely prevent the generation of abnormal noise that before. A movable bearing 12 is pressed by cams 21, 22 that are pressing members, when the seat back is stopped at a predetermined angle, to approach a worm wheel 5. A ball 14 disposed in a recess 12a of the movable bearing 12 moves slightly along an inner surface of the recess 12a so a worm 4 is pressed to the worm wheel 5 side and pressed to the fixed bearing 11 side, and a latch member 23 that is a engaging member engages the worm 4 to inhibit rotation of the worm wheel 5 thereby securely holding that state. Since the movable bearing 12 moves to the worm wheel 5 side, the substantial movement range of the ball is wider compared to a structure that supports a ball only at a fixed bearing, and the range of displacement of the worm 4 by being pressed by the ball is substantially larger.

13 Claims, 6 Drawing Sheets

U.S. PATENT DOCUMENTS

| | | | |
|---|---|---|---|
| 5,613,402 A * | 3/1997 | Gauger et al. | 74/425 |
| 5,997,089 A * | 12/1999 | Kawasaki | 297/362.14 |
| 6,247,376 B1 * | 6/2001 | Zhou et al. | 74/425 |
| 6,428,104 B1 * | 8/2002 | Sakamoto et al. | 297/362.11 |
| 6,764,136 B2 * | 7/2004 | Sakamoto | 297/362.14 |
| 6,976,738 B2 * | 12/2005 | Sakamoto | 297/362.14 |
| 7,192,090 B2 * | 3/2007 | Sakamoto | 297/216.13 |

FOREIGN PATENT DOCUMENTS

| | | |
|---|---|---|
| JP | 2004-189137 A | 7/2004 |
| JP | 2004-314749 A | 11/2004 |

\* cited by examiner (a)

(b)

RECLINING ADJUSTER

TECHNICAL FIELD

The present invention relates to a reclining adjuster provided for a seat of a vehicle and the like that suitably adjusts an angle of inclination of a seat back with respect to a seat cushion; and more particularly to a technology that reduces backlash when the seat back is locked at a predetermined angle of inclination.

BACKGROUND ART

As a locking mechanism when a seat back is stopped at a predetermined angle of inclination, Patent Document Nos. 1 and 2 disclose a technique that uses a sliding member that abuts on a worm tooth surface to stop rotation of a worm through friction, and a technique that moves the worm in a parallel manner toward a worm wheel to press the worm against the worm wheel to stop rotation of the worm through friction. Also, Patent Document No. 3 discloses a technique that forms a tapered surface on a circumference of an axis portion at one end of an axially supported worm and moves a brake member that can contact the tapered surface to stop rotation of the worm through the friction between both members.

However, the techniques disclosed in Patent Document Nos. 1 to 3 stop rotation of the worm through friction by pressing the sliding member or brake member without changing the posture of the worm, in other words while maintaining the posture of the worm axially supported at a predetermined position. Both Patent Document Nos. 1 and 2 describe also moving the worm toward the worm wheel. However, since the movement of the worm is ultimately parallel, the worm engages the worm wheel while maintaining the posture of the worm supported at a predetermined position.

Backlash exists between each of the teeth of the worm and that of the worm wheel to allow for smooth rotational movement, but this backlash is a cause of rattling or abnormal sound when the seat back is locked. The techniques disclosed in Patent Document Nos. 1 to 3 specifically relate to locking techniques to securely stop the worm, so no attention is paid to preventing the generation of rattling or abnormal sound when locking. However, these techniques press the worm against the worm wheel while maintaining the posture of the worm and substantially provide a deceleration function of the backlash when locking.

However, this backlash is not always constant due to manufacturing errors of the teeth on the worm and the worm wheel. This also varies depending on friction and deformation of the teeth through use. For that reason, the gaps between mutually meshing teeth can be larger than the appropriate clearance that can be defined as a smooth operation for backlash. In such a case, even when the worm is pressed to the worm wheel, a large clearance is generated between each of the teeth of the worm and that of the worm wheel, and the clearance can be the cause of rattling and abnormal sound when locking.

On the other hand, Patent Document No. 4 discloses a mechanism in which one end of the worm is supported by a movable bearing, and an end of the movable bearing is pressed using a compression spring. Since the movable bearing is moved by the compression spring, the worm is pushed to the gear side that is meshed therewith, and the backlash between the worm and the gear is reduced. However, the elastic force of the compression spring (force to push the worm to the gear side) is configured not only to act when stopping the rotation of the worm, but also while the worm is rotating. During the rotation, it is necessary to ensure an appropriate backlash between the teeth of the both, but in the case of Patent Document No. 4, the worm is continuously pressed by the compression spring also while the worm is rotating. Therefore, it is not possible to ensure the backlash that is required during the rotating operation, and the movement of the worm is not smooth.

In view of the points outlined above, the applicants propose, as described below to Patent Document No. 5, a mechanism that not only has a locking mechanism of the worm, but also eliminates clearance in the thrust direction of the worm when locking. The mechanism, however, does not interrupt smooth rotation of the worm when the seat back is being reclined.

In other words, Patent Document No. 5 proposes a reclining adjuster that uses a worm respectively formed with recesses at both ends, respectively secures to the brackets bearings having cavities at surfaces opposing the worm and adopts a support mechanism for the worm provided with a ball between each of the worm and the bearing to lock the teeth of the other end of the axial direction of the worm using pressing means when the seat back is stopped at a predetermined angle of inclination.

Through this, when the seat back is locked, the worm at the other end side in the axial direction is rotated about an end side thereof in the axial direction slightly toward the worm wheel side, and the ball of the other end in the axial direction moves slightly along the inner surface of the recess. Thus, an axial center of the worm is pushed to the worm wheel in a slightly oblique state. The result is that force acts on the worm in one end direction of the axial direction to the other end side of the axial direction by the ball, and the worm is slightly displaced in the thrust direction. For that reason, backlash is eliminated, and it is possible to eliminate clearance in the thrust direction of the worm even when there is much clearance. Therefore, it is possible to inhibit rattling and abnormal sounds of the seat back caused by the clearance. On the other hand, since when the seat back is being reclined, the worm is not pressed by the worm wheel, an appropriate amount of backlash required in the operation is ensured and the rotation of the worm is not hindered.

Patent Document 1: Publication of German Unexamined Patent Publication No. DE4422529A1

Patent Document 2: U.S. Pat. No. 5,590,562

Patent Document 3: Unexamined Patent Publication No. 08-38289

Patent Document 4: Utility Model Application No. 56-126667 (Unexamined Utility Model Publication No. 58-35175) Specifications and Drawings Patent Document 5: Unexamined Patent Publication No. 2003-319849

SUMMARY OF THE INVENTION

Problems to be Solved by the Invention

However, as described above, there are irregularities in the clearance in the thrust direction of the worm caused by manufacturing errors and installment errors of the worm and worm wheel. In the case of the reclining adjuster of Patent Document No. 5, the position of the worm is adjusted in a range that the ball is able to move along an inner surface of the recess, thereby no more than eliminating clearance in the thrust direction of the worm. For that reason, it is not possible to adequately handle clearance with the reclining adjuster of Patent Document No. 5, for some sizes of the clearance, and rattling can sometimes remain.

In the mechanisms any of Patent Document Nos. 1 to 5, the sliding member or plate member directly contacts the worm while it is rotating and stops the rotation through frictional force. Since the sliding member suddenly contacts the worm while the worm is rotating to increase resistance, the shock and discomfort that the seated person feels when locking the seat back are comparatively noticeable. Also, even in a case where the operation lever that operates the sliding member and plate member locks the worm by the operator releasing their hand, often times, the hand is not completely released, but continues to support the operation lever. In such a case, if the sliding member suddenly contacts the worm while the worm is rotating at high speed, the operator will feel shock and discomfort in the hand.

The present invention solves the aforementioned problems. An object of the present invention is to provide a reclining adjuster that reduces rattling more than that in the conventional techniques when locking the seat back regardless of the size of the clearance in the thrust direction of the worm or the size of the clearance between the worm and worm wheel, and even when there are variations in the sizes thereof.

The present invention provides a reclining adjuster that reduces the discomfort that the seated person feels when locking the seat back and improves the feeling of the operation of the lever when locking.

Means for Resolving the Problems

To resolve the aforementioned problems, an object of the present invention is to provide a reclining adjuster supporting a movable bracket mounted to a seat back frame, rotatably to a stationary bracket, that adjusts an angle of inclination of a seat back, comprising:

a worm supported on one of either the stationary bracket or the movable bracket; and a worm wheel that meshes with the worm, supported on the other of either the stationary bracket or the movable bracket; wherein one end in a axial direction of the worm is supported by a fixed bearing mounted on the stationary bracket or the movable bracket, and the other end in the axial direction is supported by a movable bearing which is supported movably in a direction perpendicular to the axial direction of the worm and mounted on the stationary bracket or the movable bracket;

further comprising a pressing member that presses the movable bearing in a direction to approach the worm wheel, to incline the axial center of the worm around an end of the fixed bearing side thereby pressing the worm against the worm wheel to brake the rotating speed of the worm through frictional force when holding the seat back at predetermined angle of inclination; and a engaging member that engages the worm and locks the worm to make it impossible to rotate, after rotating speed is reduced by the pressing member.

It is preferred that recesses are formed in each of the opposing surfaces of the fixed bearing and the worm, and each of the opposing surfaces of the movable bearing and the worm, and that the worm is configured to be supported through balls housed between each of the mutually opposing recesses.

It is preferred that each of the recesses is formed into a substantially conical shape having a tapered inner surface. Also, it is preferred that the recess formed in the movable bearing is formed into a substantially conical shape having a tapered inner surface, and that a long hole extended along the movable direction of the movable bearing is formed. Furthermore, it is preferred that the recess formed in the movable bearing at a lower position than that of the center of the long hole is formed to extend downward with a narrower width than that of the portion equivalent to the diameter of the round hole, seen from the front side.

The worm has convex portions disposed on surfaces respectively opposing the fixed bearing and movable bearing. It is acceptable for the convex portions to engage the recesses disposed on surfaces respectively opposing the worm on the fixed bearing and the movable bearing.

The pressing members are preferably composed of cams rotatably urged by a spring member from a position which pressing portions of the cams face the fixed bearing to a direction which the pressing portions abut on the movable bearing. The engaging member is preferably composed of a latch member rotatably urged by a spring member in the same direction as that of the cams.

The cams and latch member are urged by different spring members. It is preferred that when holding the seat back at a predetermined angle of inclination, elastic force of the spring member that urges the cams functions to first press the cams to the movable bearing, then the latch member engages the worm.

It is preferred that the pressing portion on the cam that abuts on the movable bearing is disposed more at a leading position along a direction to be reciprocatingly moved by each spring member than the engaging portion on the latch member that engages the worm.

It is preferred that the latch member has a pin insertion long hole compose of a long hole in a front-back direction along the direction of rotation at a lower position than that of a center of rotation;

the cam has a pin insertion round hole at a lower position than that of the center of rotation; and a pin is inserted in the pin insertion long hole of the latch member and the round shaft insertion through hole of the cam;

the latch member is linked to an operation lever and moves in a direction to engage or disengage the worm according to the operating direction of the operation lever;

when the operation lever operates in one direction, the latch member moves in a disengaging direction, resisting elastic force of a spring member to urge the latch member, the pin presses a hole wall of the pin insertion long hole to move the latch member and the cam together in an disengaging direction; and when the operation lever operates in the other direction and the pin returns to substantially a central position of the pin insertion long hole, the cam and latch member are returned by elastic force of the spring member, the cam positioned at the lead along the returning direction presses the movable bearing, then the latch member engages the worm.

The engaging member is preferably constituted to enable only an end of the worm at the movable bearing side to be engaged, while pressing the same in a direction to push to the worm wheel.

Engaging grooves are preferably formed on a circumference of the teeth of the worm at the end of the movable bearing side, and the latch member is preferably provided with an engaging portion that can engages the engaging grooves.

It is preferred that the latch member is disposed to transmit force in a direction for the engaging portion of the latch member that engages the engaging grooves on the worm to engage deeper into the engaging grooves when a backward moment is added to the seat back, when the worm is rotated through the worm wheel.

EFFECTS OF THE INVENTION

According to the present invention, when the seat back is inclined at a predetermined angle of inclination, the movable bearing is pressed by the pressing member to approach the worm wheel. A ball (or a convex portion if a convex portion that protrudes from the worm is adopted instead of a ball) disposed in the recess of the movable bearing is pressed by the inner surface of the recess in the movable bearing, and the movable bearing and the worm are pushed to the worm wheel. For that reason, the backlash between the worm and worm wheel is reduced, and that backlash is eliminated for some sizes of the backlash. Only the movable bearing approaches the worm wheel, thus the worm operates to rotate slightly around the fixed bearing side, and compared to a position of the axial center when the worm is rotating normally, the axial center is displaced and obliquely inclined. The result is the ball being pressed by the movable bearing presses the worm to the fixed bearing side, and the clearance in the thrust direction of the worm is reduced and this clearance is eliminated for some sizes of the clearance. Through this, when the movable bearing is pressed by the pressing member, the frictional force between the pressing member and the worm is increased, thereby reducing the rotating speed of the worm. When the brake is applied to the rotation of the worm, the engaging member then engages the worm and the rotation of the worm is securely prohibited to maintain the state.

The result is that backlash and clearance in the thrust direction of the worm are reduced, or eliminated, thereby restraining rattling. Particularly, with the present invention, when compared to a conventional structure that supports the worm with only fixed bearings, regardless of the differences in the size of the clearance in the thrust direction of the worm, or the size of the clearance of the worm and worm wheel caused by the parts used or mounting error, the clearance is unaffected by these and is either extremely small between both or the movable bearing moves until clearance is eliminated. For that reason, rattling when the seat back is locked is more securely suppressed than was conventionally possible.

Also, if the engaging member has a structure to press and lock only the end portion of the worm at the movable bearing from substantially the same direction as the direction in which the movable bearing is pressed by the pressing member, the ball disposed in the recess of the movable bearing or the convex portion disposed on the worm moves slightly further in a direction to approach the worm wheel along the inner surface of the recess after the movable bearing is moved, as long as there is room in the recess. Therefore, with that configuration, the engaging member does not only function as a member that completely stops the rotation of the worm, it also has the dual function to reduce the backlash of the worm and clearance in the thrust direction to zero by rotating the axial center of the worm around the fixed bearing side slightly so that the worm is obliquely inclined when it is not possible to completely adjust in the movable range of the movable bearing (when the backlash or clearance in the thrust direction cannot be brought completely to zero), thereby further increasing the effect of suppressing rattling and abnormal sound generated when locking the seat back.

Also, with the present invention, the engaging member does not directly engage the worm when the worm is rotating at high speed. It engages the worm after rotation speed is reduced so the person seated does not feel any discomfort when the engaging member is locked, and this reduces sound that is generated when engaging compared to when the engaging member suddenly engages the worm while the worm is rotating at high speed. Usually, the operation lever that operates the pressing members and the engaging member is supported by the hand while the seat back is being reclined, but with the present invention, rotation of the worm is inhibited by frictional force with the action of the pressing members and rotation is completely stopped by the frictional force when locked by the engaging member so that the feeling of the operation transmitted to the hand is graduated and smooth, which is different from the conventional configuration that stops completely and suddenly.

| Explanation of Symbols | |
| --- | --- |
| A Reclining Adjuster | |
| 1, 2 | Stationary Brackets |
| 3 | Movable Bracket |
| 4 | Worm |
| 4a, 4b | Recesses |
| 4c | Engaging Grooves |
| 5 | Worm Wheel |
| 11 | Fixed Bearing |
| 12 | Movable Bearing |
| 11a, 12a | Recesses |
| 13, 14 | Balls |
| 21, 22 | Cams |
| 21c, 22c | Pressing Portions |
| 23 | Latch Member |
| 23c | Engaging Member |
| 27, 29 | Coil Springs |
| 40 | Operation Lever |

BEST MODE FOR CARRYING OUT THE INVENTION

Figure 1:
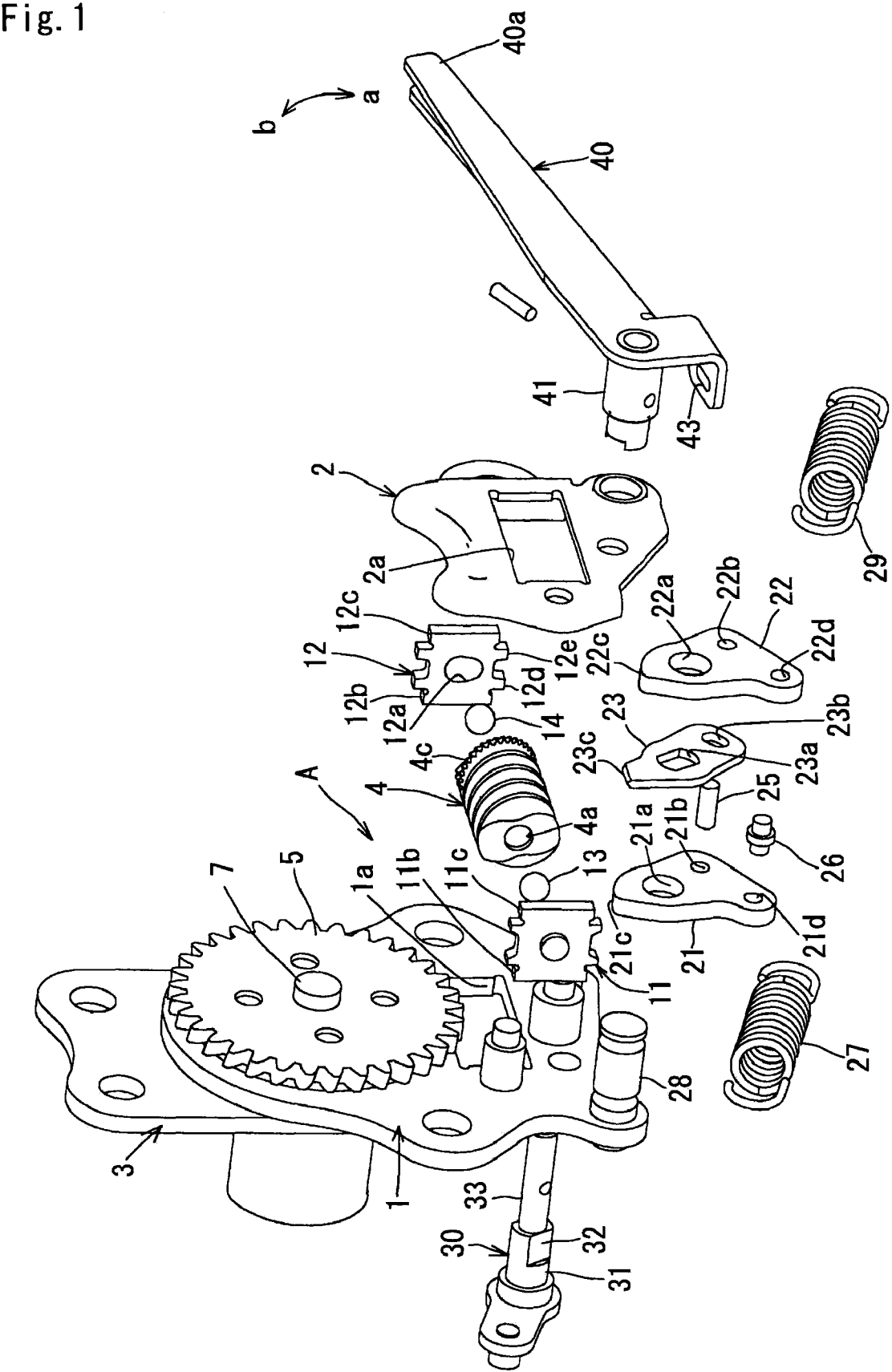
FIG. 1 is an exploded perspective view of a reclining adjuster according to an embodiment of the present invention.
Figure 2:
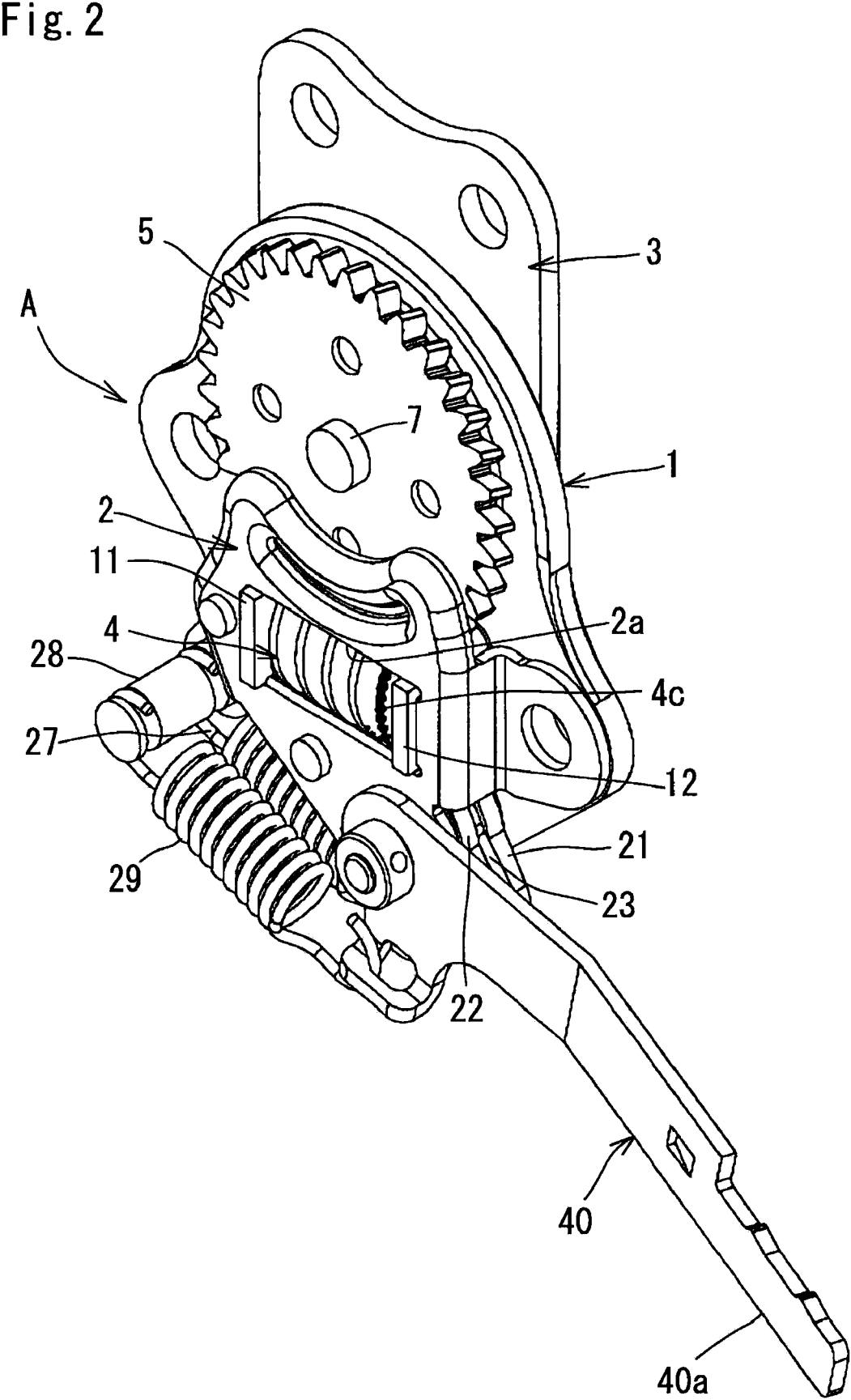
FIG. 2 is a perspective view showing an assembly of the reclining adjuster.
Figure 3:
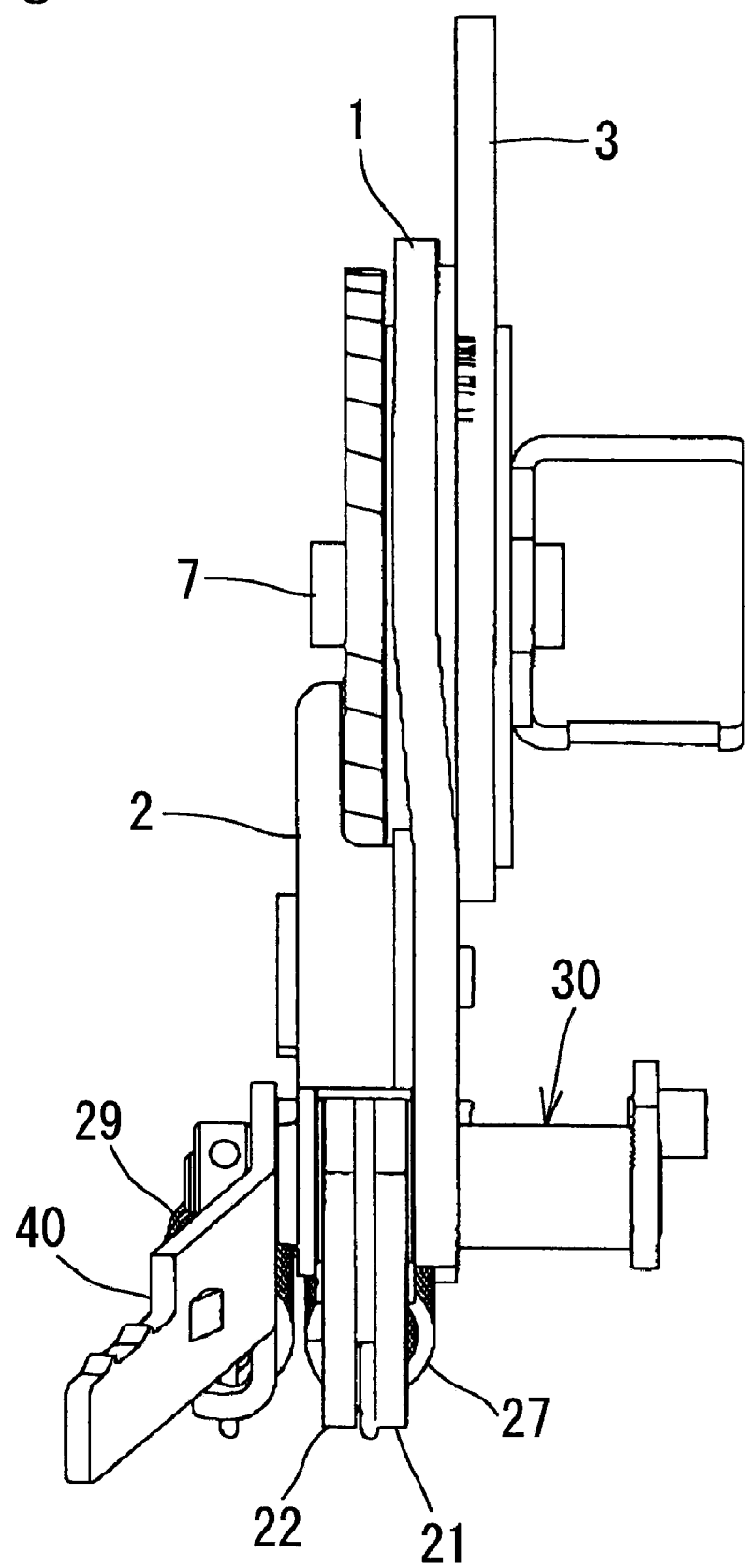
FIG. 3 is a front view showing an assembly of the reclining adjuster.

The present invention will now be explained in detail based on an embodiment shown in the drawings. FIG. 1 is an exploded perspective view of the reclining adjuster A according to the embodiment. FIG. 2 is a perspective view showing the assembly of the reclining adjuster A, and FIG. 3 is a front view. As shown in these drawings, the reclining adjuster A is provided for a seat cushion (not shown) or the like, and includes a pair of stationary brackets 1, 2 opposingly disposed, and a movable bracket 3 connected to a back frame (not shown) of the seat back.

Substantially rectangular worm support holes 1a, 2a are provided in the stationary brackets 1, 2 to support the worm 4. A fixed bearing 11 and a movable bearing 12 formed into substantially square plate shapes, having recesses 11a and 12a in an inner surface, are supported near each end of the worm support holes 1a, 2a. In other words, with the recesses 11a, 12a in a state where they mutually oppose each other, the edges 11b, 12b on one side are positioned in the worm support hole 1a, and the other edges 11c, 12c are positioned in the worm support hole 2a. However, while the fixed bearing 11 is formed in a size that it does not move up and down when the edges 11b, 11c are fitted with the worm support holes 1a, 2a respectively, and the movable bearing 12 is in a state where the edges 12b, 12c are positioned in the worm support holes 1a, 2a respectively, and is formed in a size that provides some play to move up and down.

Recesses 4a, 4b are formed at each of the both ends of the worm 4. These recesses 4a, 4b are disposed to respectively oppose the recess 11a of fixed bearing 11 and the recess 12a of the movable bearing 12. Balls 13 and 14 are respectively housed in a space formed by the recess 4a on one side of the worm 4 and the recess 11a of the fixed bearing 11, and the space formed by the recess 4b on the other side of the worm 4 and the recess 12a of the movable bearing 12. With this arrangement, the worm 4 is rotatably supported between the fixed bearing 11 and the movable bearing 12 through the balls 13 and 14.

Figure 4:
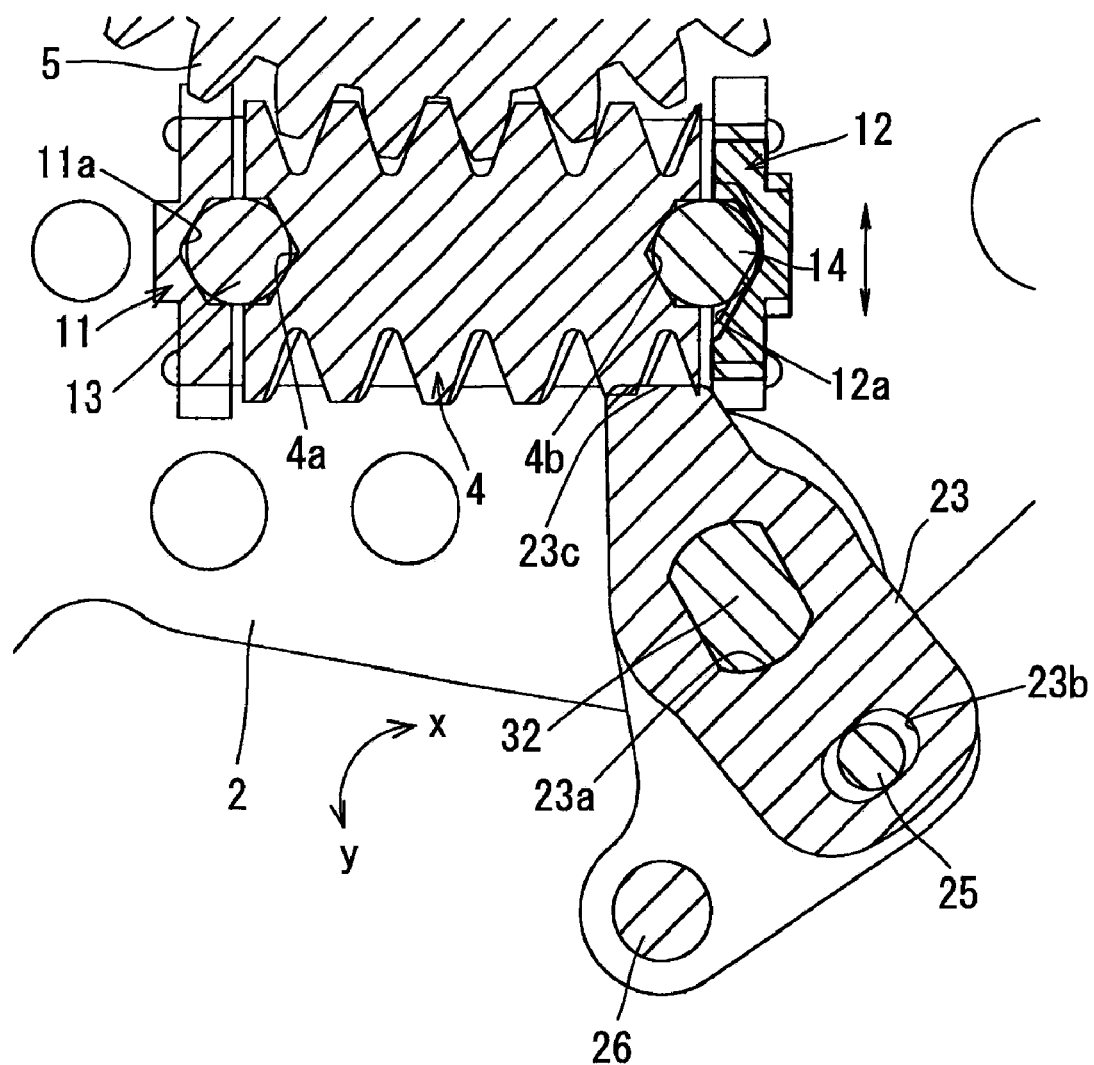
FIG. 4 is an explanatory view of the operation of the reclining adjuster.

The recesses 4a, 4b formed in the end surfaces of the worm 4 and the recess 11a formed in the fixed bearing 11, and the recess 12a formed in the 1) movable bearing 12 are formed into substantially conical shapes, and each has a tapered inner surface having a substantial center thereof as the deepest portion (see FIG. 4). For that reason, when either of the balls 13, 14 is to move by rotating in the space, a force acts to press the opposing recess 4a of the worm 4 from the recess 11a of the fixed bearing 11 in the axial direction or to press the recess 4b of the worm 4 from the recess 12a of the movable bearing 12 in the axial direction, regardless of the direction they slip. However, as shown in FIGS. 1 and 4, the recess 12a of the movable bearing 12 is not a round hole seen from the front, but it is preferred that this is a long hole shape (substantially oval or substantially egg shaped) in a longitudinal direction (a direction substantially along the operation direction of the movable bearing 12). It is also preferred that the portion lower than the center of the long hole is formed to extend downward with a width that is slightly narrower than that of the portion equivalent to the diameter of the round hole. The result is that when the movable bearing 12 is pushed upward, the ball 14 is pressed from below by the inner surface of the recess 12a without slipping right or left, and the inner surface of the other recess 4b of the worm 4 is pressed upward, and the end of the worm 4 positioned in the movable bearing 12 side rotates slightly around the center of the fixed bearing 11 (the ball 13) to approach the worm wheel 5. In other words, the end of the worm 4 rotates around the ball 13.

The movable bracket 3 overlaps one of the stationary brackets 1, and is rotatably connected to the stationary bracket 1 by a shaft 7 that penetrates the stationary bracket 1 in the thickness direction. The worm wheel 5 that meshes with the worm 4 is fixed to this shaft 7. Therefore, the worm wheel 5 rotates together with the rotation of the movable bracket 3 connected to the seat back frame through the shaft 7. Note that the worm 4 has a lead angle equal to or larger than a friction angle with the worm wheel 5. Also, as shown in FIG. 1, for the worm wheel 5, it is acceptable to use a helical gear having teeth around the entire circumference thereof, or a sector gear.

The following will now explain the pressing member and engaging member that lock the movable bearing 12 and the worm 4. The pressing member has two cams 21 and 22. The engaging member is composed of the latch member 23. The two cams 21, 22 and the latch member 23 are supported by a shaft member 30 between the two stationary brackets 1, 2 sandwiching the latch member 23 between the two cams 21, 22. Specifically, round shaft insertion through holes 21a, 22a are formed respectively in the two cams 21, 22, and an irregularly shaped shaft insertion through hole 23a having substantially long hole shape provided with a pair of mutually parallel inner surfaces is formed in the latch member 23. The shaft member 30 has a large-diameter cylindrical portion 31 at one end thereof being circular in the cross section, and at a portion adjacent to that has an irregularly shaped portion 32, a portion thereof being a flat surface, and has a small diameter shaft 33 adjacent to the irregularly shaped portion 32. The small diameter shaft 33 is inserted from the stationary bracket 1, and is fit into the cylindrical projection 41 formed at a base end of the operation lever 40 inserted from the outside of the other stationary bracket 2. The shaft insertion through hole 21a of the cam 21 is positioned on the outer circumference of the large-diameter cylindrical portion 31 of the shaft member 30; the irregularly shaped shaft insertion through hole 23a of the latch member 23 is positioned on the irregularly shaped portion 32; and the shaft insertion through hole 22a at the other side cam 22 is positioned on the outer circumference of the cylindrical projection 41 of the operation lever 40. Therefore, when the operation lever 40 is rotated, the large-diameter cylindrical hole portion 31 of the shaft member 30 and the cylindrical projection 41 of the operation lever 40 slip in the shaft insertion through holes 21a, 22a of the cams 21, 22, so rotational force is directly transmitted only to the latch member 23 whose irregularly shaped shaft insertion through hole 23a is fit into the irregularly shaped portion 32.

The cams 21, 22 are formed in substantially triangular shapes. The top edge portions have pressing portions 21c, 22c that press the movable bearing 12, and the shaft insertion through holes 21a, 22a that are the centers of rotation are formed in substantially central portions. Also, at a bottom, front end side, the round shaft insertion through holes 21b, 22b are formed. The top edge portion of the latch member 23 presses the worm 4, and has an engaging portion 23c that engages engaging grooves 4c, described below. The irregularly shaped shaft insertion through hole a 23a that is the center of rotation is formed substantially in the central portion, and therebelow, a the pin insertion through hole 23b having a long hole shape composed of a long hole in the front-back direction is formed along the direction of rotation of the latch member 23. A pin 25 is inserted into these shaft insertion through holes 21b, 22b, and the pin insertion through hole 23b having the long hole shape. Holes 21d, 22d that mount the spring linking shaft 26 are formed in the back, end side on the bottom of the cams 21, 22. Each end of the spring linking shaft 26 is inserted into the holes 21d, 22d, and a central portion thereof engages one end of a coil spring 27 that is a spring member for the cams. The other end of the coil spring 27 engages a stationary spring linking shaft 28 disposed near the trailing edge side (the front side shown in FIG. 1) of the stationary brackets 1, 2. In an ordinary state, the coil spring 27 pulls the trailing end side of the bottom portion of the cams 21, 22 to the front side of side of FIG. 1 (the direction of the arrow X in FIG. 4), and the pressing portions 21c, 22c are provided to constantly press the movable bearing 12.

The cams 21, 22 are urged by the coil spring 27 from a position which the pressing portions 21c, 22c thereof face the fixed bearing 11 to a direction which the pressing portions 21c, 22c abut on the movable bearing 12 (in other words in the direction of the arrow X in FIG. 4), and the latch member 23 is urged by the coil spring 29, described below, in the same direction as the cams 21, 22. The pressing portions 21c, 22c of the cams 21, 22 are disposed to be more at the leading position than the engaging portion 23c of the latch member 23, along the direction of the operation to return (in other words in the direction of the arrow X in FIG. 4) by these coil springs 27, 29. (See FIG. 5(b).) In order to set the pressing portions 21c, 22c of the cams 21, 22 more at the leading position than the engaging portion 23c of the latch member 23, the shapes of the cams 21, 22 or the latch member 23 can be devised for that purpose, and it is also possible to set by adjusting the mounting angle to the shaft member 30. By making this setting, initially, the cams 21, 22 abut on the movable bearing 12 to move the same, then the latch member 23 engages the worm 4, when the cams 21, 22 and latch member 23 return.

Note that one end of the other coil spring 29 to function as a spring member of the latch member 23 and to function as a spring member that returns the operation lever 40 to its home position is engaged to the stationary spring linking shaft 28, and the other end of the coil spring 29 is engaged to a spring engaging hole 43 formed at a base portion of the operation lever 40. So, the coil spring 29 elastically urges the leading end portion 40a of the operation lever 40 downward in a normal state.

Therefore, when the leading end portion 40a of the operation lever 40 is lifted, resisting the elastic force of the other coil spring 29, the latch member 23 rotates in the direction of the arrow Y in FIG. 4 (the disengaging direction), and the pin 25 relatively moves in the pin insertion through hole 23b having a long hole shape thereby pressing a wall (inner wall) of the pin insertion through hole 23b having a long hole shape, particularly the portion positioned on the lower side of the hole wall. At that time, because the pin 25 is inserted in the pin insertion through holes 21b, 22b, it presses the hole walls of the pin insertion through holes 21b, 22b, and rotates the cams 21, 22 in the same direction of the arrow Y in FIG. 4 while resisting the elastic force of the one coil spring 27. On the other hand, when the operation lever 40 returns to its original position, and the pin 25 returns to substantially the central position of the pin insertion through hole 23b having a long hole shape, the one coil spring 27 performs the recovery operation immediately and urges the cams 21, 22 in the direction of the arrow X in FIG. 4. The elastic force of the one coil spring 27 does not act on the latch member 23, so the operation lever 40 rotates in the direction of the arrow X (the engaging direction) of FIG. 4 in an action to be recovered to its home position by the elastic force of the other coils spring 29.

The movable bearing 12 is mounted to have play in up and down directions on one end of the worm support holes 1a, 2a, but has projection pieces 12d, 12e that project downward between the stationary brackets 1, 2. The pressing portions 21c 22c of the cams 21, 22 are disposed to be able to abut on these projecting pieces 12d, 12e. Also, the engaging grooves 4c are formed on the circumference surface of at least one tooth portion of the worm 4. The engaging portion 23c of the latch member 23 that composes the engaging member engages the engaging grooves 4c. These engaging grooves 4c are preferred to be formed only on the tooth peripheral surface at an end of the movable bearing 12 side of the worm 4. The engaging portion 23c of the latch member 23 engages the engaging grooves 4c at the end of the movable bearing 12, so the worm 4 is pressed from substantially the same direction as the movable bearing 12 is pressed by the cams 21, 22 which are the pressing members.

The following will now explain the actions of the reclining adjuster A of the configuration described above. To change the angle of inclination of the seat back, the operation lever 40 is operated to lift up the leading end portion 40a in the direction of the arrow b in FIG. 1 while resisting the elastic force of the other coil spring 29. When doing that, the shaft portion 30 connected to the operation lever 40 rotates in the direction of the arrow Y of FIG. 4, and the latch member 23 engaged to the irregularly shaped portion 32 of the shaft member 30 rotates in the same direction. Since the cams 21, 22 are disposed on the circumference of the large-diameter cylindrical portion 31 of the shaft member 30 and the cylindrical projection 41 of the operation lever 40, differing from the latch member 23, the cams 21, 22 do not rotate immediately even when the shaft member 30 begins to rotate. When the latch member 23 has been rotated at a predetermined angle, the relative position of the pin 25 inserted into the pin insertion through hole 23b having a long hole shape formed in the latch member 23 changes to press the hole wall of the pin insertion through hole 23b having a long hole shape, thereby also rotating the cams 21, 22 in the direction of the arrow Y of FIG. 4.

Figure 5:
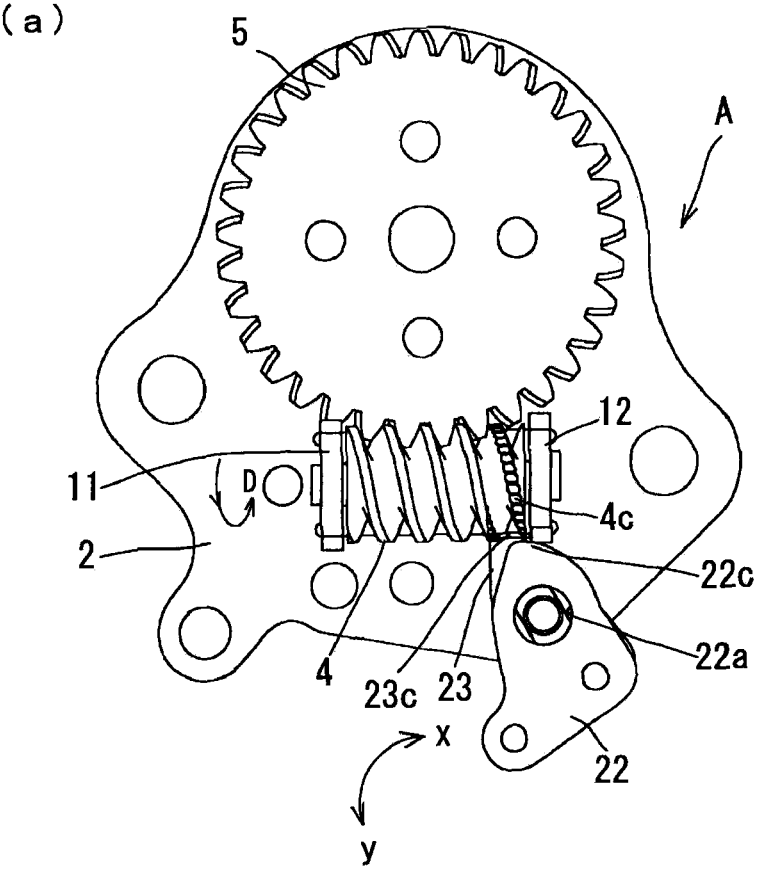
FIG. 5(a) is a view of the seat back locked in the reclining adjuster.
FIG. 5(b) is a view showing the seat back in a state ready to be reclined.
Figure 5:
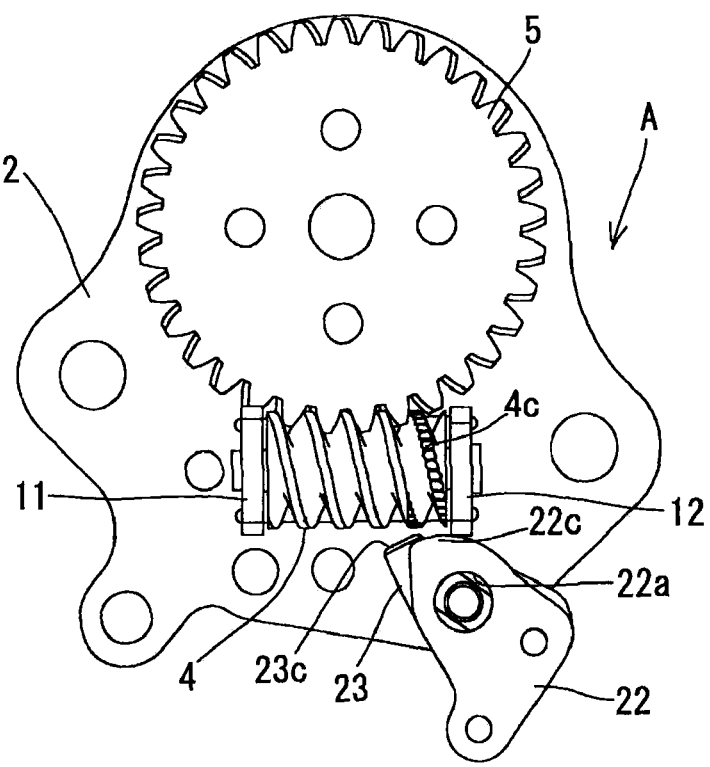

As shown in FIG. 5(b), the engaged state of the engaging portion 23c of the latch member 23 and the engaging grooves 4c of the worm 4 is released, and the pressing force of the cams 21, 22 on the movable bearing 12 is also released so the worm 4 can rotate freely. The worm 4 has a lead angle equal to or larger than the friction angle with the worm wheel 5 that meshes therewith, so it rotates along with the rotation of the worm wheel 5.

Figure 6:
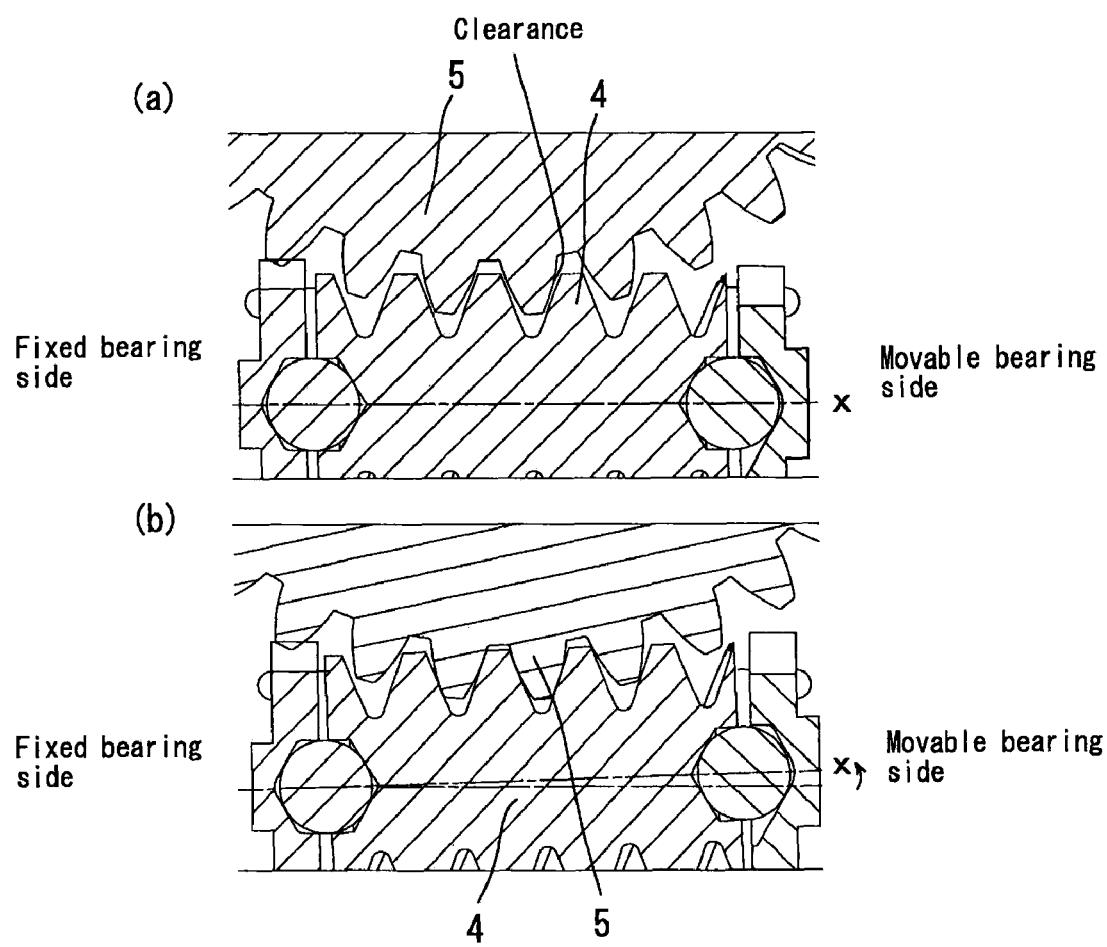
FIGS. 6(a) and 6(b) are expanded views of the operation of the worm.

When an operator removes his hand from the leading end of the operation lever 40 at a predetermined position, the elastic force of the coil spring 29 moves the leading end portion 40a of the operation lever 40 in the direction of the arrow a in FIG. 1 to return the lever to the home position. When the operation lever 40 tries to return to the home position, the pin 25 returns to substantially the central position of the pin insertion through hole 23b having a long hole shape of the latch member 23. This causes force that had been pressing the cams 21, 22 in the direction of the arrow Y in FIG. 4 to be released, so the one coil spring 27 returns and urges the cams 21, 22 in the direction of the arrow X in FIG. 4. As shown in FIG. 5(a), the pressing portions 21c, 22c of the cams 21, 22 press the projecting pieces 12c, 12d of the movable bearing 12 upward, to press the worm in the direction to approach the worm wheel 5. In other words, when the movable bearing 12 is pushed upward, the inner surface of the recess 12a presses the ball 14 from below since the recess 12a is formed in a long hole shape having the bottom with a slightly narrower width. When this happens, the ball 14 pressed upward the inner surface of the other recess 4b of the worm 4 to approach the worm wheel 5. At that time, the ball 14 tries to move upward inside the recess 4a, so the end of the worm 4 positioned on the movable bearing 12 side (in other words, the end of the side formed with the recess 4b) is pushed to approach the worm wheel 5 side around the ball member 13 of the fixed bearing 11 side. The result is that a slight rotation and the axial center of the worm 4 becomes slightly inclined compared to before the movable bearing 12 was pressed by the cams 21, 22. In other words, the worm 4 is displaced from the state shown in FIG. 6(a) to that shown in FIG. 6(b), and the axial center X of the worm 4 is slightly inclined. This causes a pressing force to act on the worm 4 to be pressed to the fixed bearing 11 side by the ball 14. The rotation angle of the worm 4 (or the angle of inclination of the axial center) differs depending on the size of the backlash of the worm 4 and worm wheel 5 and the size of the clearance in the thrust direction caused by friction and the like between each of the teeth of the worm 4 and worm wheel 5. The size of the rotation angle of the worm 4 (or the inclination angle of the axial center) increases as the sizes of these increase. At this time, because this embodiment is configured for the movable bearing 12 to move upward, it is possible to increase the size of the rotation angle of the worm 4 (or the inclination angle of the axial center) beyond the conventional size according to the sizes of the backlash and clearance, and even if there are large dimension errors or installation errors in the worm 4 or worm wheel 5, the errors are absorbed, thereby decreasing clearance in the thrust direction of the worm 4. Also, it is possible to eliminate backlash or clearance and the like in the thrust direction with only the movement of the movable bearing 12 for some dimension errors and the like of the worm 4. At the same time, this also inhibits rattling or the generation of abnormal sounds in the seat back caused by this clearance, thereby improving the comfort of the seat.

The movable bearing 12 is pressed by the cams 21, 22, so clearance and the like in the thrust direction of the worm 4 are reduced, or almost completely eliminated, but according to this embodiment, as described above, since the pressing portions 21c, 22c of the cams 21, 22 are disposed to be more at the leading position along the direction of the arrow X than the engaging portion 23c of the latch member 23, after the cams 21, 22 press the movable bearing 12, the elastic force of the other coil spring 29 causes to engage the engaging portion 23c with the engaging grooves 4c of the worm 4. (See FIG. 5(a)) This prevents rotation of the worm 4, thereby ensuring a lock. Also, the engaging grooves 4c are formed only on the end of the worm 4 at the movable bearing 12 side. Therefore, the latch member 23 not only stops rotation of the worm 4 by rotating and engaging in the direction of the arrow X in FIG. 4, but also has the function of pressing the end of the worm 4 at the movable bearing 12 side toward the worm wheel 5. As described above, with the movable bearing 12 being pressed by the cams 21, 22, the ball 14 is positioned downward in the recess 12a having a long hole shape in the movable bearing 12. Space exists to allow the ball 14 to move upward in the recess 12a. When there is substantially zero backlash or clearance in the thrust direction since the movable bearing 12 is being pressed, the ball 14 does not move at all even if pressed by the latch member 23, but at this stage, if there is clearance or the like that cannot be completely eliminated by the movement of the movable bearing 12, the pressing by the latch member 23 moves the ball 14 slightly upward in the recess 12a. The result is that the worm 4 further rotates slightly around the fixed bearing 11 side (ball 13), thus residual clearance and the like in the thrust direction can be further reduced.

Also, according to this embodiment, when the worm 4 is pressed to the worm wheel 5 by the action of the cams 21, 22 to rotate slightly around the fixed bearing 11 side (ball 13), at that stage, the frictional force between both causes deceleration in the rotating speed of the worm 4. The engaging portion 23c of the latch member 23 engages after the rotation of the worm 4 is inhibited in this way. For that reason, the latch member 23 does not directly engage when the worm 4 is rotating at high speed so the generation of abnormal noise when engaging is suppressed. Since the worm 4 is decelerated gradually, the seat back that has been reclining at a predetermined speed is not suddenly stopped at a predetermined angle, and the shock to the seated person is alleviated when the reclining action is stopped, thereby improving the seating comfort when the seat back is reclined.

Still further, when the operation lever 40 is manually operated to lock the seat back at a predetermined reclined angle, the seated person often checks the comfort of the seat as to whether the reclining angle is appropriate while supporting the operation lever 40 by their hand without immediately releasing their hand from the operation lever 40. However, in such a case, according to the embodiment, the worm 4 is decelerated by the actions of the cams 21, 22, and is stopped thereafter by the engagement of the latch member 23. Therefore, the back and the like of the seated person not only feels comfort in the seat, but feels the smooth operation in their hand transmitted through the operation lever 40.

When a backward moment is added to the seat back, and the worm 4 is rotated through the worm wheel 5, it is preferred that the engaging member 23c of the latch member 23 that is engaging the engaging grooves 4c of the worm 4 can be disposed so that force is transmitted in the direction to deeply engage the engaging grooves 4c. In other words, with this embodiment, when a backward moment is added to the seat back, the worm 4 is rotated in the direction of D in FIG. 5(a) by the worm wheel 5. For that reason, the engaging portion 23c of the latch member 23 that is engaging the engaging grooves 4c of the worm 4 tries to rotate in the direction of X in FIGS. 4 and 5(a). However, when rotating in the direction of X, the engaging portion 23c deeply engages into the engaging grooves 4c. When adjusting the seat back by reclining, normally the seated person adjusts the seat back by pushing with their back. Therefore, if the latch member 23 is disposed in this manner, the moment acts toward the backside when the seat back is adjusted, so when the seated person releases their hand from the operation lever 40, the engaging portion 23c immediately bites deeply into engaging grooves 4c at that point. On the other hand, if the latch member 23 is not disposed so that force acts in the direction of the arrow X when the backward moment acts on the seat back, at the point that the seated person releases their hand from the operation lever 40, the engaging member 23c does not bite deeply into the engaging grooves 4c and there is the possibility that the seat back will be at half-way position. So, if a backward moment is further added to the seat back, the engaging member 23c bites deeply from that half-way state into the engaging grooves 4c thereby generating the noise of its operation at that time. On the other hand, if for some reason the coil spring 29 ceases to function and a large load is applied to the backward of the seat back by a rear or front collision, the engaging portion 23c of the latch member 23 is deeply biting into the engaging grooves 4c of the worm 4 so that lock cannot be easily unlocked even if the coil spring is not functioning, if the latch member 23 is disposed as the embodiment described above.

Note that with the embodiment described above, the configuration house balls 13, 14 in the supporting surfaces of the recesses 4a, 4b formed at each end of the worm 4 and the recess 11a formed in the fixed bearing 11 and the recess 12a formed in the movable bearing 12, but it is also possible for a configuration that disposes a convex portion (not shown) at each end of the worm 4 and to engage the convex portions in the recess 11a formed in the fixed bearing 11 and the recess 12a formed in the movable bearing 12.

What is claimed is:

1. A reclining adjuster supporting a movable bracket mounted to a seat back frame, rotatable in relation to a stationary bracket, that adjusts an angle of inclination of a seat back, comprising:

a worm supported on one of either the stationary bracket or the movable bracket; and a worm wheel that meshes with the worm, supported on the other of either the stationary bracket or the movable bracket; wherein one end in a axial direction of the worm is supported by a fixed bearing mounted on the stationary bracket or the movable bracket, and the other end in the axial direction is supported by a movable bearing which is supported movably in a direction perpendicular to the axial direction of the worm and mounted on the stationary bracket or the movable bracket;

further comprising a pressing member movably mounted with respect to the stationary bracket that presses the movable bearing in a direction to approach the worm wheel, to incline the axial center of the worm around an end of a fixed bearing side thereby pressing the worm toward the worm wheel to brake the rotating speed of the worm through frictional force when holding the seat back at predetermined angle of inclination; and a engaging member movably mounted with respect to the stationary bracket that engages the worm and locks the worm to make it impossible to rotate, after the rotating speed is reduced by the pressing member.

2. The reclining adjuster according to claim 1, wherein recesses are respectively formed in opposing surfaces of the fixed bearing and the worm and opposing surfaces of the movable bearing and the worm; and the worm is supported by balls respectively housed in the mutually opposing recesses.

3. The reclining adjuster according to claim 2, wherein each of the recesses is formed into a substantially conical shape having a tapered inner surface.

4. The reclining adjuster according to claim 3, wherein the recess formed in the movable bearing is formed in a substantially conical shape having a tapered inner surface, and is formed into a long hole shape extending along the movable direction of the movable bearing.

5. The reclining adjuster according to claim 4, wherein the recess formed in the movable bearing at a lower position than that of the center of the long hole is formed to extend downward with a narrower width than that of a portion equivalent to a diameter of a round hole, seen from the front side.

6. The reclining adjuster according to claim 1, wherein the worm has convex portions disposed on each of surfaces opposing the fixed bearing and the movable bearing, the convex portions respectively engaging the recesses disposed on the surfaces opposing the worm on the fixed bearing and the movable bearing.

7. The reclining adjuster according to claim 1, wherein the pressing member is composed of a cam rotatably urged by a spring member from a position which a pressing portion of the cam faces the fixed bearing to a direction which the pressing portion of the cam abuts on the movable bearing; and the engaging member is composed of a latch member rotatably urged by a spring member in a direction that is the same rotatable direction as the cam.

8. The reclining adjuster according to claim 7, wherein the cam and latch member are urged by different spring members, and wherein the cam initially presses the movable bearing by the elastic force of the spring, and then the latch member engages the worm, when holding the seat back at a predetermined angle of inclination.

9. The reclining adjuster according to claim 8, wherein the pressing portion on the cam that abuts on the movable bearing is disposed more at a leading position along a direction to be reciprocatingly moved by each spring member than the engaging portion on the latch member that engages the worm.

10. The reclining adjuster according to claim 9, wherein the latch member has a pin insertion long hole compose of a long hole in a front-back direction along the direction of rotation at a lower position than that of a center of rotation;

the cam has a pin insertion round hole at a lower position than that of the center of rotation; and a pin is inserted in the pin insertion long hole of the latch member and the round shaft insertion through hole of the cam;

the latch member is linked to an operation lever and moves in a direction to engage or disengage the worm according to the operating direction of the operation lever;

when the operation lever operates in one direction, the latch member moves in a disengaging direction, resisting elastic force of a spring member to urge the latch member, the pin presses a hole wall of the pin insertion long hole to move the latch member and the cam together in an disengaging direction; and when the operation lever operates in the other direction and the pin returns to substantially a central position of the pin insertion long hole, the cam and latch member are returned by elastic force of the spring member, the cam positioned at the lead along the returning direction presses the movable bearing, then the latch member engages the worm.

11. The reclining adjuster according to claim 7, wherein the engaging member enables only an end of the worm at the movable bearing side to be engaged, while pressing the same in a direction to push the worm wheel.

12. The reclining adjuster according to claim 7, wherein engaging grooves are formed on a circumference of the teeth of the worm at the end of the movable bearing side, and the latch member is provided with a engaging portion that can engage the engaging grooves.

13. The reclining adjuster according to claim 12, wherein the latch member is disposed to transmit force in a direction in which the engaging portion of the latch member that engages the engaging grooves on the worm engages deeper into the engaging grooves, as the worm is rotated through the worm wheel by a backward moment added to the seat back.

* * * * *